United States Patent Office 2,764,573
Patented Sept. 25, 1956

2,764,573

CONDENSATION PRODUCTS OF GLYOXAL MONOUREIN AND ALDEHYDES

Bruno v. Reibnitz, Mannheim-Feudenheim, Alfred Woerner, Limburgerhof, Pfalz, and Hans Scheuermann, Ludwigshafen (Rhine)-Oggersheim, Germany, assignors to Badische Anilin- & Soda-Fabrik Aktiengesellschaft, Ludwigshafen am Rhine, Germany No Drawing. Application August 16, 1952,
Serial No. 304,841

Claims priority, application Germany August 17, 1951

13 Claims. (Cl. 260—67.5)

This invention relates to the production of nitrogenous condensation products.

We have found that new and industrially valuable nitrogenous condensation products are obtained by reacting monoureins of the general formula:

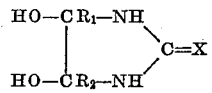

(in which $R_1$ and $R_2$ may be hydrogen atoms or identical or different organic radicals, preferably alkyl, aryl or aralkyl radicals, and X is an oxygen or sulfur atom) with aldehydes, preferably formaldehyde, or substances which split off aldehydes or mixtures of the same.

The most simple representative of the monoureins suitable for the process is the monourein of glyoxal, and further homologous compounds are for example the monoureins of diacetyl or benzil or the corresponding thioureins. Generally speaking, the monoureins are derived from $\alpha,\beta$-dicarbonyl compounds.

The reaction of the monoureins with aldehydes can be carried out in the absence of solvents or in aqueous medium or also in alcoholic solvents, and in the latter case the alcoholic solvent is partly co-reacted and becomes joined to the resin molecule by ether bridges. The condensation can be carried out in alkaline, neutral or acid medium, and it is advantageous to carry out at least the last stages of the condensation in the acid region.

When the condensation is carried out in aqueous solution in the neutral or alkaline region, there are obtained by using 1 to 2½ mols of formaldehyde per mol of monourein, clear solutions of excellent capacity for being stored in which the methylol compounds of the monoureins are preferentially present and which may be employed as initial solutions for further reactions, in particular with monohydric or polyhydric alcohols. When the condensation is carried out in the acid region, the reaction leads to the formation of high molecular condensation products with the splitting off of water.

By the further condensation of the precondensates prepared in neutral, alkaline or acid medium, with an addition of the acid-reacting catalysts known for the preparation of aminoplasts, as for example free acids, acid-reacting metal salts, such as zinc chloride, ammonium salts and the like, highly viscous resin solutions are obtained which may be employed in the adhesives industry. The concentrated solutions harden in the acid region by heating at 80° to 120° C. in the course of 1 to 2 days, but in the form of thin films within an hour.

In order to carry out an intercondensation with alcohols, the alcohols may be added to the monourein-aldehyde mixtures in any phase. It is preferable, however, first to prepare the alkylolmonourein or the precondensates from monoureins and aldehydes, and then to react these with alcohols. Alcohols suitable for the process are for example water-soluble saturated and unsaturated monohydric and/or polyhydric alcohols, such as methanol, ethanol, propanol, allyl alcohol, ethylene glycol, glycerine and the like. The water-soluble partial ethers or partial esters of polyhydric alcohols may, however, also be reacted. The condensation products prepared in the presence of these alcohols or alcohol derivatives are characterized by a very high elasticity.

It is also possible, during the condensation according to this invention, to add monohydric and/or polyhydric alcohols of only limited solubility in water, as for example butanol or pentanol. It is preferable to carry out the last condensation in this case as far as possible in the absence of water. Instead of using alcohols having only limited solubility in water, their ethers or esters still containing free hydroxyl groups may also be employed. The condensation products prepared with these alcohols or alcohol derivatives have, in addition to a high elasticity, a very good water-repellency.

The alcohol-modified monourein resins may be used with advantage in the lacquer field and can be combined well with other film-forming substances, such as cellulose nitrate and alkyd resins.

The known substances which react with aldehydes with the formation of resins, for example aminoplast-forming substances, such as urea, cyanamide, melamine, polyvalent urethanes, or phenoplast-forming substances, such as phenols and their derivatives and substitution products may be added during the condensation of the monoureins with aldehydes or compounds splitting off aldehydes or during the course of the further condensation of the alkylol compounds. The condensation products thus obtained have as a rule considerably better elasticity properties than the condensation products from aldehydes and the said resin-forming substances without the addition of monoureins.

The following examples will further illustrate this invention but the invention is not restricted to these examples. The parts are by weight.

*Example 1*

200 parts of 30 per cent formaldehyde solution are added to 118 parts of the monourein of glyoxal in a stirring container and 0.5 part of calcium hydroxide is introduced. The urein dissolves completely during the course of an hour, the temperature rising to about 45° C. After stirring for a further 3 hours, carbon dioxide is led in and the solution filtered from the deposited calcium carbonate. By concentration in vacuo, a highly viscous liquid is obtained which after complete removal of water by storage over phosphorus pentoxide gives the crystalline dimethylol compound of glyoxal monourein (C=33.67 per cent, H=5.93 per cent, N=15.96 per cent).

In the usual case the methylol compounds of monoureins are formed by reacting the respective monourein with formaldehyde or formaldehyde donors in a molecular ratio of 1:1 to 1:2.5 at a pH of 5 to 9, preferably 7 to 8.5. To obtain a weakly alkaline reaction the formaldehyde solutions which generally have a weakly acid reaction are combined with acid-binding substances, e. g. alkali metal or alkaline earth metal hydroxides or carbonates. The optimum reaction temperatures are between 10° and 60° C., but higher temperatures may also be used.

The methylol compounds of monoureins, unlike the methylol compounds of other aminoplast-forming substances, are outstandingly stable and remarkable for their long life in storage.

Example 2

100 parts of the viscous solution prepared and concentrated as described in Example 1 are heated to boiling after the addition of 2.8 parts of concentrated phosphoric acid dissolved in 100 parts of n-butanol. A solution is formed in a relatively short time. The solution, after being poured onto a glass plate and hardened for 2 hours at 80° to 100° C., yields a lustrous, relatively elastic film.

Example 3

100 parts of the solution concentrated in vacuo as described in Example 1 are heated in vacuo at 70° to 80° C. with an addition of 2 parts of concentrated phosphoric acid and further concentrated. Shortly before it gelatinizes, the solution is poured out onto a glass plate and hardened by being allowed to stand in a drying cupboard. The cast and hardened film is characterized by excellent elasticity.

Example 4

118 parts of glyoxal monourein, 250 parts of 30 per cent formaldehyde solution and 520 parts of n-butanol are boiled with an addition of 1 part of magnesium carbonate and azeotropically dehydrated until the temperature has risen to 98° C. Then 3.5 parts of phthalic anhydride dissolved in about 30 parts of butanol are added and the whole further condensed at the said temperature while returning the water and solvent, for 30 minutes. The azeotropic dehydration is then continued with an addition of about 10 per cent of toluene until the temperature has risen to 115° C. The solution is then concentrated to about 60 per cent in vacuo. 30 parts of the concentrated, about 60 per cent, solution are stirred with 35 parts of a castor oil-modified alkyd resin and 50 parts of titanium white to form a lacquer. The lacquer film prepared therewith hardens nail-hard in an hour at 120° C. The elasticity of the lacquer film is excellent and its water-repellency good.

The procedure may also be that after the condensation in the presence of phthalic acid has been carried out, 100 parts of a condensation product from 3 mols of hexanetriol and 1 mol of adipic acid having an acid number of about 30 are added and dehydration then carried out. A lacquer product is thus obtained which yields excellent elastic films by burning-in without the addition of castor oil-modified alkyd resin.

Generally speaking it is advantageous in the manufacture of alcohol-modified condensation products to carry out the first step of the condensation at a pH of 5 to 9, preferably 7 to 8.5 and then to set up a pH inferior to 4.5 by the addition of acid. The alcohol may be present already in the first step of the reaction or it may be added not until acidification takes place or until a certain condensation stage has been reached. The last condensation in the acid region is to take place, preferably, in an anhydrous medium. The condensation is preferably carried out at boiling temperature.

The alcohol-modified condensation products are clear oils of a medium viscosity which are compatible with alkyd resins, cellulose derivatives and alcohol-modified urea resins. They are soluble in alcohols, ketones, esters and hydrocarbons and give stoving varnishes of great hardness, high gloss and outstanding elasticity.

Example 5

118 parts of glyoxal monourein, 60 parts of urea and 400 parts of 30 per cent aqueous formaldehyde solution are adjusted to pH 8.0 by the addition of caustic soda solution and heated to boiling. 5 minutes after commencement of boiling, the solution is acidified to pH 3.0 with formic acid and kept at the boiling temperature for an hour. After neutralization and concentration in vacuo, a highly viscous solution is obtained which can be employed as a film-forming substance or as casting resin after the addition of acids, as for example 2 parts of phosphoric acid to 100 parts of solution. By the addition of stronger acids, as for example hydrochloric acid, the hardening takes place while cold, whereas with phosphoric acid it is preferable to harden while heating. The hardened resin obtained has a better elasticity than pure urea resins.

Example 6

118 parts of monourein, 400 parts of 30 per cent aqueous formaldehyde solution and 50 parts of melamine are boiled at a pH of 7.5 to 8.0 and concentrated while maintaining this pH range. A solution is obtained which is clear when hot and which after the addition of acids and diluents, such as 10 to 20 parts of rye flour to 100 parts of concentrated solution, may be used for hot gluing of plywood.

Example 7

A solution of 250 parts of neutral 30 per cent aqueous formaldehyde, 153 parts of glyoxal monourein, 550 parts of butanol, 40 parts of toluene and 5 parts of phthalic anhydride is boiled and azeotropically dehydrated. At 94° C. a solution of 200 parts of urea in 780 parts of 30 per cent formaldehyde is allowed to flow into the butanol solution in such manner that the temperature remains at 94° C. As soon as the said solution has been introduced, azeotropic dehydration is continued. A lacquer solution is obtained which can be processed well with alkyd resins and yields elastic and lustrous films.

Example 8

118 parts of monourein, 100 parts of phenol, 350 parts of 30 per cent aqueous formaldehyde, 2 parts of concentrated sodium hydroxide solution and 9 parts of concentrated ammonium hydroxide solution are boiled under reflux until slight clouding of the resin solution takes place. It is then dehydrated in vacuo to a syrupy consistency.

When burnt-in at 120° C., especially after the addition of acid hardening catalysts, the resin yields waterproof and elastic films.

What we claim is:

1. A process for the production of nitrogenous condensation products which comprises condensing glyoxal monourein with formaldehyde.

2. A process for the production of nitrogenous condensation products which comprises condensing an aqueous solution of glyoxal monourein having a pH of 4 to 9 with formaldehyde in a molecular ratio from 1:1 to 1:2.5.

3. A process for the production of nitrogenous condensation products which comprises condensing in an aqueous medium glyoxal monourein with formaldehyde in a molecular ratio from 1:1 to 1:2.5, wherein the condensation is carried out at least in the final stage in an acid medium.

4. A process for the production of nitrogenous condensation products which comprises condensing glyoxal monourein with formaldehyde in the presence of alcohol, wherein the condensation is carried out at least in the final stage in an acid medium.

5. A process for the production of nitrogenous condensation products which comprises condensing glyoxal monourein with formaldehyde in an aqueous medium of alkaline reaction and heating the methylol compounds obtained with an alcohol in the presence of an acid-reacting substance.

6. A process for the production of nitrogenous condensation products which comprises condensing formaldehyde with glyoxal monourein and another substance capable of forming resins with aldehydes, said substance being selected from the class consisting of urea, melamine and phenol.

7. A process for the production of nitrogenous condensation products which comprises condensing in an aqueous medium formaldehyde with glyoxal monourein and another substance capable of forming resins with aldehydes, selected from the class consisting of urea, melamine and phenol, wherein at least in the final stage the condensation is carried out in the acid medium.

8. A methylol compound of glyoxal monourein having the formula

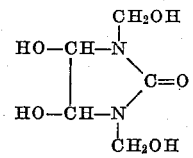

9. A resinous condensation product of glyoxal monourein and formaldehyde.

10. A resinous condensation product of glyoxal monourein, formaldehyde and butanol.

11. A resinous condensation product of glyoxal monourein, urea, and formaldehyde.

12. A resinous condensation product of glyoxal monourein, melamine and formaldehyde.

13. A resinous condensation product of glyoxal monourein, phenol, and formaldehyde.

References Cited in the file of this patent
UNITED STATES PATENTS

| | | |
|---|---|---|
| 2,574,114 | Lehmann et al. | Nov. 6, 1951 |
| 2,613,210 | Hurwitz et al. | Oct. 7, 1952 |
| 2,700,033 | Boyd et al. | Jan. 18, 1955 |

OTHER REFERENCES

Behrend et al.: Liebigs Ann., vol. 339, pages 1–13 (1905).

Pauly et al.: Ber. 63B, pages 2063–9 (1930), abstracted in Chem. Abs., 25, 2795, 1931.

Winheim et al.: Chemical Abstracts, vol. 44, col. 9177, 1950.